United States Patent
Pattee

(10) Patent No.: US 6,858,138 B2
(45) Date of Patent: Feb. 22, 2005

(54) SEPTIC TANK KIT

(75) Inventor: Harley Pattee, Orlando, FL (US)

(73) Assignee: EZ Tanks, Inc., Orlando, FL (US)

( * ) Notice: Subject to any disclaimer, the term of this patent is extended or adjusted under 35 U.S.C. 154(b) by 7 days.

(21) Appl. No.: 10/439,024

(22) Filed: May 14, 2003

(65) Prior Publication Data

US 2004/0060857 A1 Apr. 1, 2004

Related U.S. Application Data

(60) Provisional application No. 60/415,458, filed on Oct. 1, 2002, and provisional application No. 60/450,974, filed on Feb. 28, 2003.

(51) Int. Cl.[7] ............................................... B01D 21/02
(52) U.S. Cl. ..................... 210/232; 210/532.2; 220/4.16
(58) Field of Search ................................ 210/170, 232, 210/521, 532.1, 532.2, 538, 542; 220/4.12, 4.16, 4.28, 4.33

(56) References Cited

U.S. PATENT DOCUMENTS

| | | | | |
|---|---|---|---|---|
| 726,551 A | * | 4/1903 | Lloyd ........................ | 220/4.12 |
| 1,715,466 A | * | 6/1929 | Miller ...................... | 210/532.2 |
| 2,607,727 A | * | 8/1952 | Butler ....................... | 210/538 |
| 2,666,030 A | * | 1/1954 | Blanchard ................ | 210/532.2 |
| 2,806,629 A | * | 9/1957 | Britton et al. ............. | 220/4.12 |
| 3,266,656 A | * | 8/1966 | Kridle ....................... | 220/4.28 |
| 5,198,113 A | * | 3/1993 | Daniels ..................... | 210/170 |
| 5,722,551 A | * | 3/1998 | Cocciemiglio, Jr. ........ | 220/4.33 |
| 5,738,781 A | * | 4/1998 | Carlson .................... | 210/532.2 |
| 6,576,130 B2 | * | 6/2003 | Wallace .................... | 210/532.1 |

FOREIGN PATENT DOCUMENTS

JP          6-117015     *  4/1994

* cited by examiner

*Primary Examiner*—Christopher Upton
(74) *Attorney, Agent, or Firm*—Saliwanchik, Lloyd & Saliwanchik

(57) ABSTRACT

The septic tank of the subject invention can be provided in kit form, and preferably comprises a tank lid, a tank bottom, a pair of opposing side walls, and a pair of opposing end walls having a tank flow outlet and a tank flow inlet, where a flange is affixed within the tank flow outlet and the tank flow inlet. The tank lid comprises a pair of lid openings, which are covered by hatch covers. The hatch covers comprise a hatch handle for ease of removal and are removable affixed to the tank lid with angle connection brackets. The septic tank is assembled using angle connection brackets, where the brackets are affixed to the tank lid, tank bottom, side walls, and end walls using, for example, stainless steel cap screws. A silicone sealant is interposed between the tank lid, tank bottom, side walls, end walls and the connection brackets, forming a substantially leak proof seal.

3 Claims, 16 Drawing Sheets

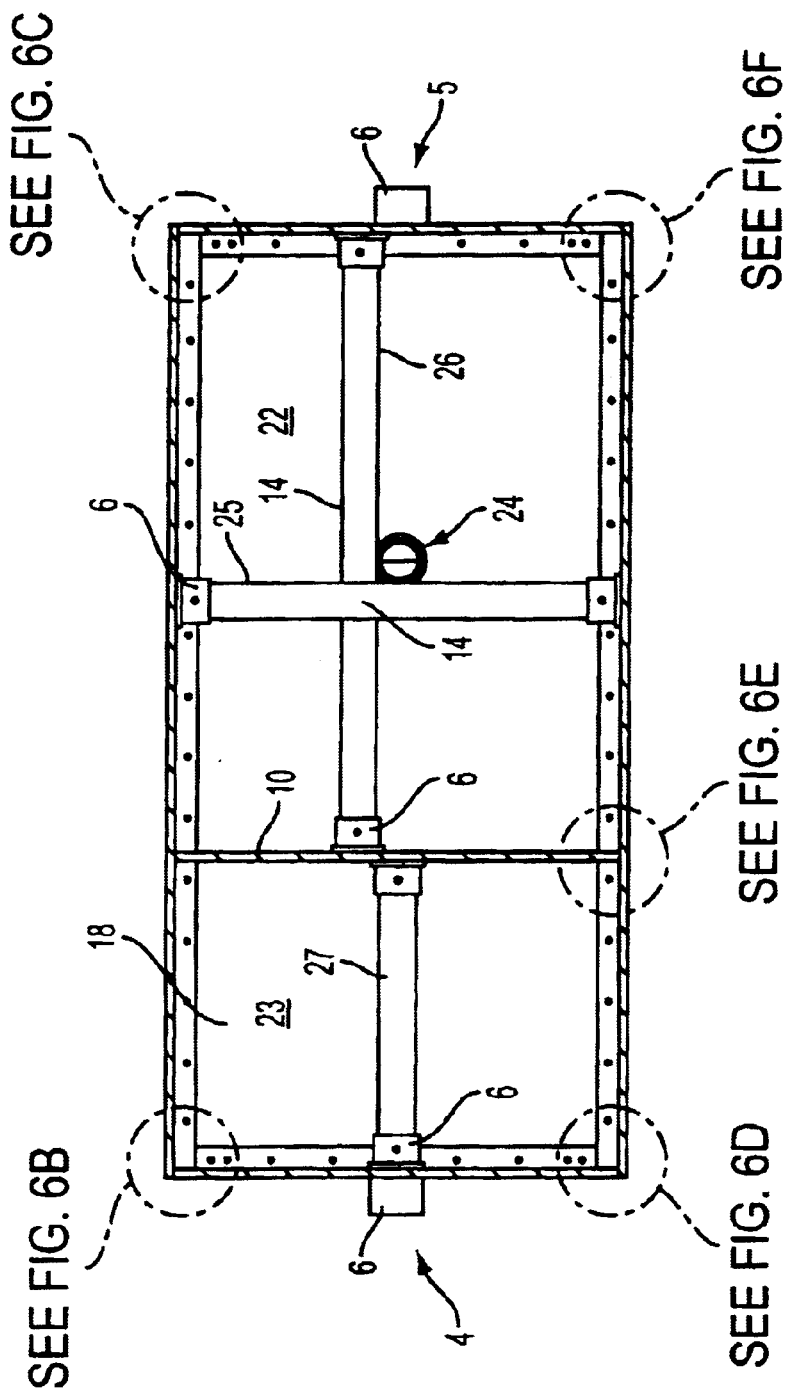

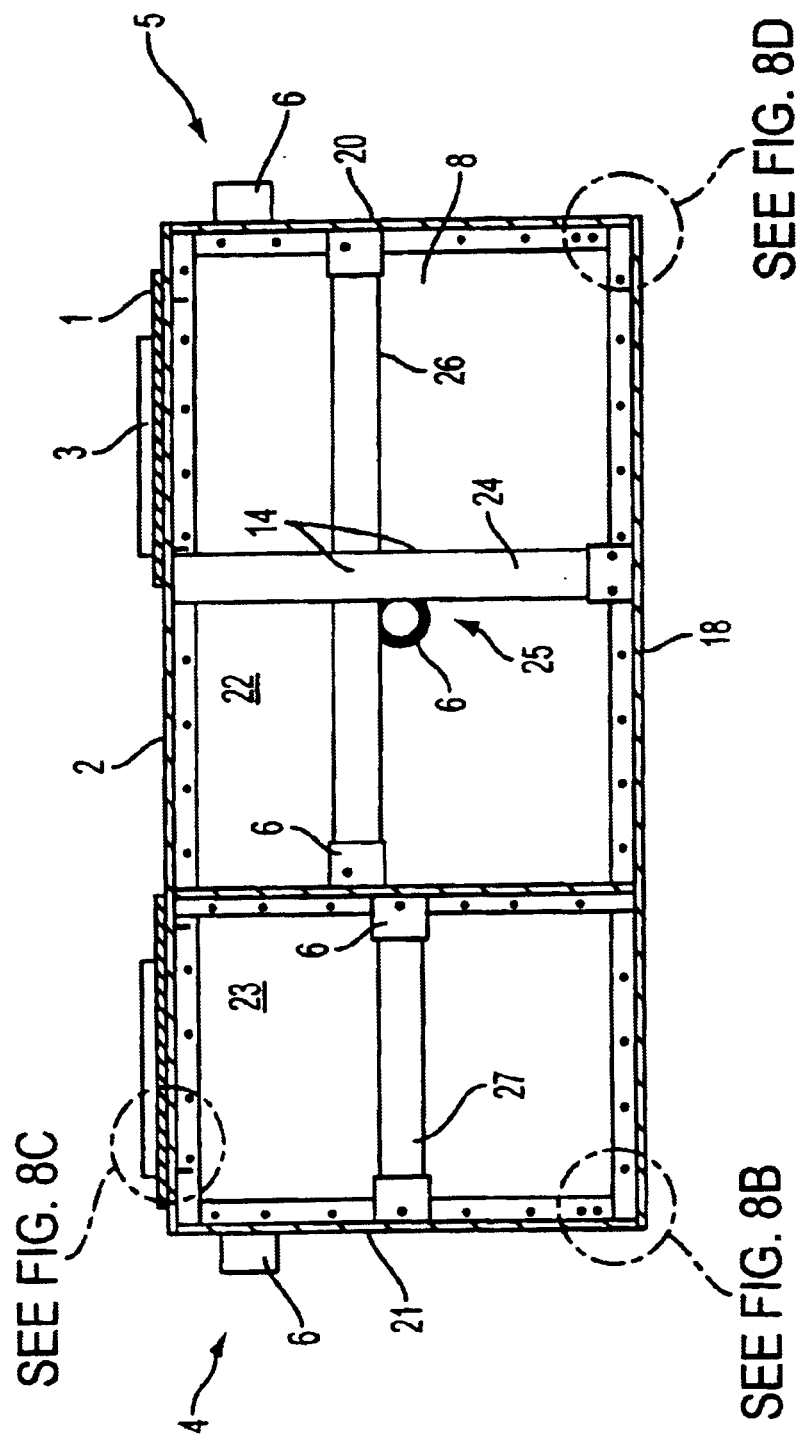

SEPTIC TANK KIT

CROSS-REFERENCE TO A RELATED APPLICATION

This application claims the benefit of provisional patent application Ser. No. 60/415,458, filed Oct. 1, 2002 and provisional patent application Ser. No. 60/450,974, filed Feb. 28, 2003; both of which are hereby incorporated by reference in their entirety.

FIELD OF THE INVENTION

The present invention relates generally to septic tanks, and more particularly, to a septic tank kit which can optionally be assembled at the site of installation.

BACKGROUND OF THE INVENTION

Septic tanks are typically used at dwellings that are not connected to public sewage facilities. The septic tank is typically located underground and is basically a batch sewage processor. Sewage from the dwelling is sent to the septic tank where it is acted on by microorganisms, where through biochemical reactions the sewage is decomposed. Subsequently, liquid and gaseous effluent is discharged into the surrounding soil. Solids remaining in the tank are periodically cleaned. More information regarding septic tanks can be found in, for example, Woodson, R. Dodge: *Builder's Guide to Wells and Septic Systems*, McGraw Hill; and Burks, Bennette D. and Mary Margaret Minnis: *Onsite Wastewater Treatment Systems*, Hogarth House, Ltd. Both of these are incorporated herein by reference to the extent they are not inconsistent with the following explicit teachings.

Prior art septic tanks are often made of concrete, glass fiber reinforced resin materials, or rotationally molded plastic materials. Because of the septic tank size and weight, they are typically transported to the work site by truck, and may require a crane for placing into position.

BRIEF SUMMARY OF THE INVENTION

The septic tank of the subject invention is available as a septic tank kit which can be assembled on site comprising, in a preferred embodiment, a tank lid, a tank bottom, a pair of opposing side walls, and a pair of opposing end walls having a tank flow outlet and a tank flow inlet, where a flange is affixed at the tank flow outlet and at the tank flow inlet. The tank lid preferably comprises a pair of lid openings, which are covered by removable hatch covers. The hatch covers preferably comprise a hatch handle for ease of removal and in one embodiment are removably affixed to the tank lid with angle connection brackets.

The septic tank is assembled using angle connection brackets, where the brackets are affixed to the tank lid, tank bottom, side walls, and end walls using fasteners such as, for example, stainless steel cap screws. A silicone sealant can be interposed between the tank lid, tank bottom, side walls, end walls and the connection brackets, forming a substantially leak proof sealing gasket.

The septic tank kit further preferably comprises a baffle positioned within the septic tank to form two compartments: an inlet compartment ideally but not necessarily encompassing approximately ⅔ of the total volume of the tank, and an outlet compartment. The baffle presents a barrier which enables the larger sediment to settle in the inlet compartment, with the remaining effluent flowing into the outlet compartment through a baffle port.

To provide greater structural rigidity, the septic tank can comprise structural support. For example, the inlet compartment can comprise vertical and horizontal structural supports, where at least one vertical support member is interposed between the tank lid and the tank bottom, being connected to the tank bottom using a flange or collar. The inlet compartment can further comprise two or more horizontal support members, wherein at least one horizontal support is connected to and interposed between the side walls, and the at least one other horizontal support is connected to and interposed between the inlet end wall and the baffle. The vertical support can be affixed to the horizontal supports to provide greater stability.

The outlet compartment can optionally comprise at least one horizontal support, where the horizontal support is connected to and interposed between the outlet end wall and the baffle.

For ease of use and transportation to the work site, the septic tanks taught herein are available in an unassembled condition where they can then be assembled on the work site. Although not necessary, it is preferred that kits according to the subject invention include instructions for assembly into septic tanks.

This is the first teaching of using sheet plastic, or flat plastic panels, for the construction of septic tanks. Acceptable plastics include, but are not limited to, such plastics as homopolymer polypropylene (homopolymer) or copolymer polypropylene (copolymer). As will be readily apparent to the skilled artisan in view of the teachings herein, any and all plastics available as sheet stock (i.e., PVC, polyethylene) can be used to practice the subject invention. It is also the first teaching of the use of extrusion welding in the manufacture of septic tanks. Extrusion welding is a well-known technique where an extruded plastic wire, (for example, ⅛" or 3/16" diameter polypropylene) is superheated, melting and effectively forming a caulk between two plastic sheets or panels. Superheated air from the tip of the welding gun also heats and melts the panels and the bead of caulk forming a homogeneous weld bonding the sheets (or whatever other forms of plastic are the subject of the weld) together. In addition, the subject invention constitutes the first use of plastic angles and special plastic extrusions (such as, for example, right angle brackets of PVC, copolymer polypropylene or homopolymer polypropylene) with fasteners (such as, for example, stainless steel screws) to manufacture or assemble septic tanks.

All patents, patent applications and publications referred to or cited herein, or from which a claim for benefit of priority has been made, are incorporated by reference in their entirety to the extent they are not inconsistent with the explicit teachings of this specification, including U.S. Pat. No. 4,882,046; U.S. Pat. No. 4,961,670; U.S. Pat. No. 5,361,930; and U.S. Pat. No. 6,280,614.

These and other objects, features and advantages of the present invention will be more readily understood with reference to the following detailed description, read in conjunction with the accompanying figures.

BRIEF DESCRIPTION OF THE DRAWINGS

FIGS. 6A–F are open top views of a septic tank according to the subject invention.

FIG. 8A-D are side views of the vertical section of a septic tank according to the subject invention.

DETAILED DISCLOSURE OF THE INVENTION

Figure 1:
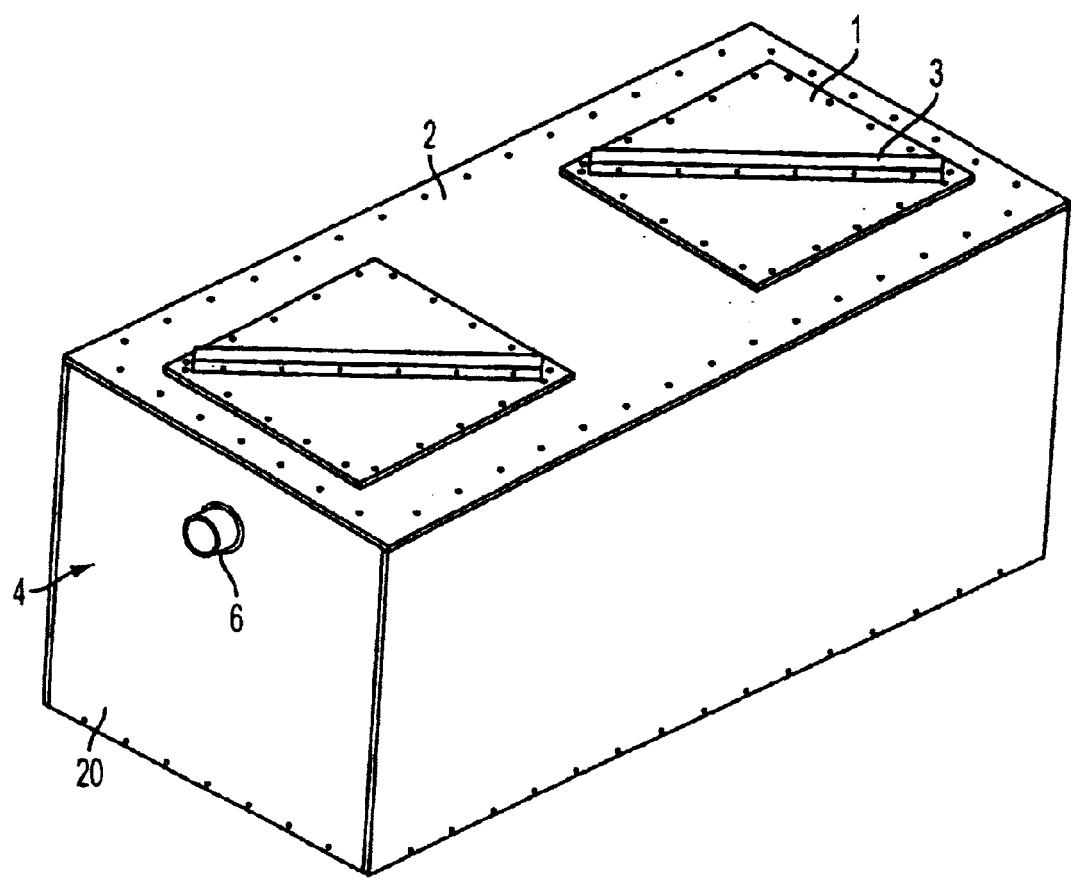
FIG. 1 is a perspective view of one embodiment of the subject invention assembled septic tank kit.
Figure 2A:
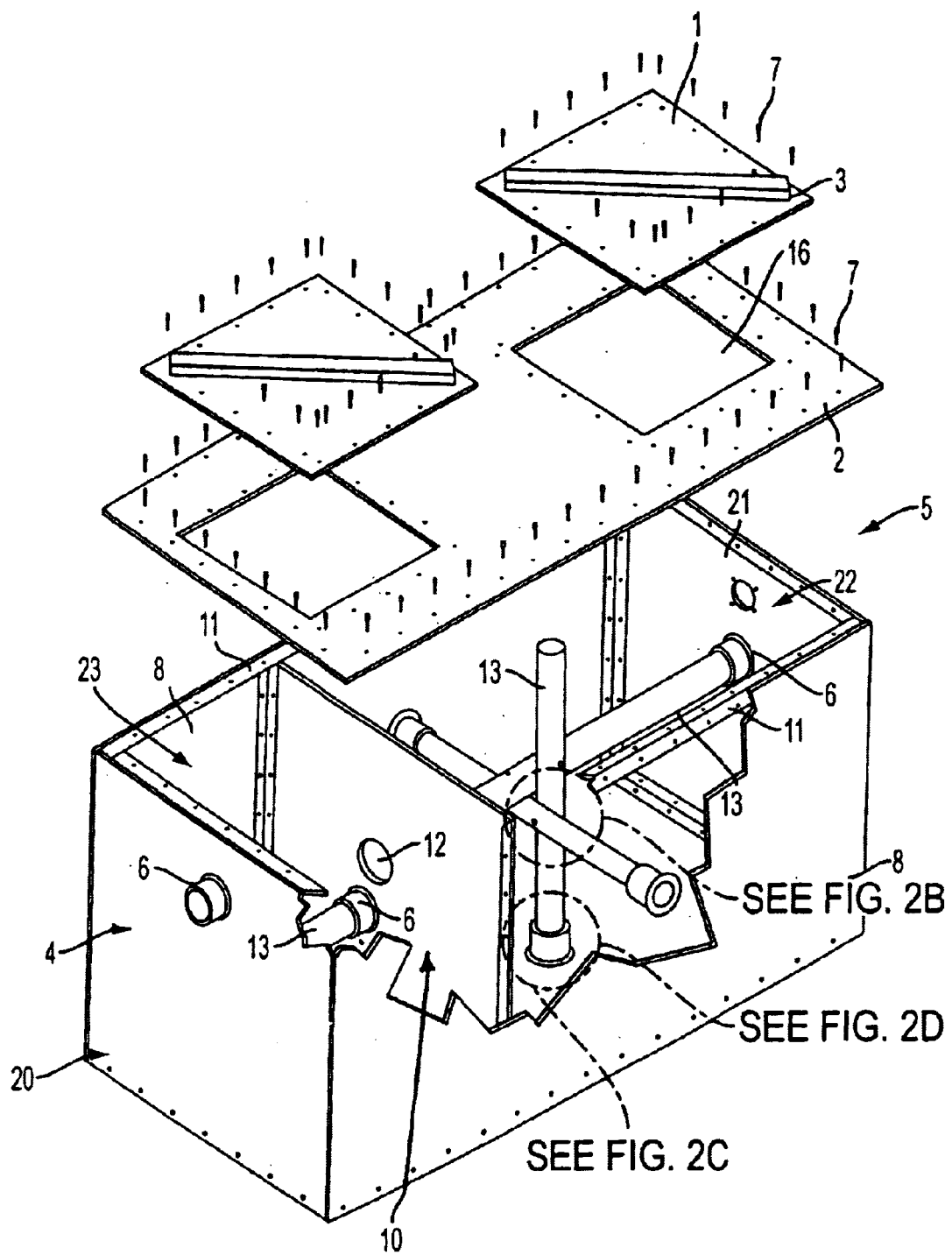
FIGS. 2A–D are perspective views of the septic tank assembly of the subject invention of FIG. 1 with the tank lid and hatches shown off.
Figure 2B:
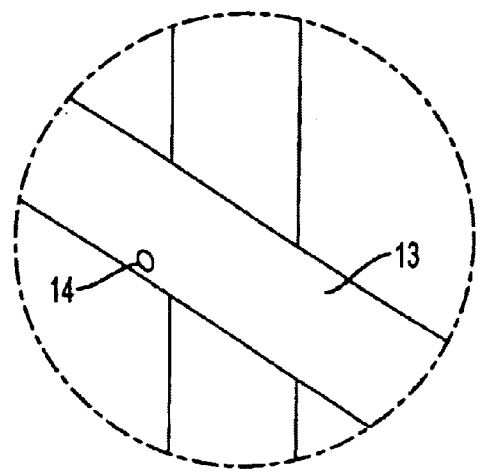
Figure 2C:
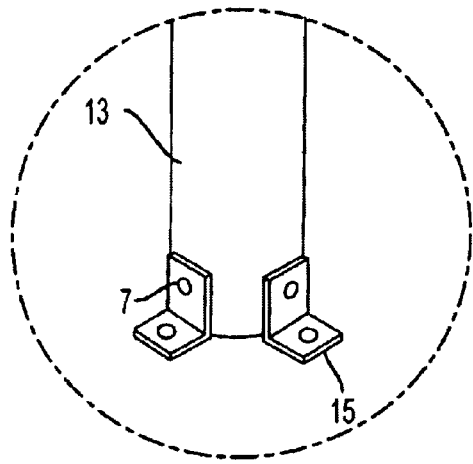
Figure 2D:
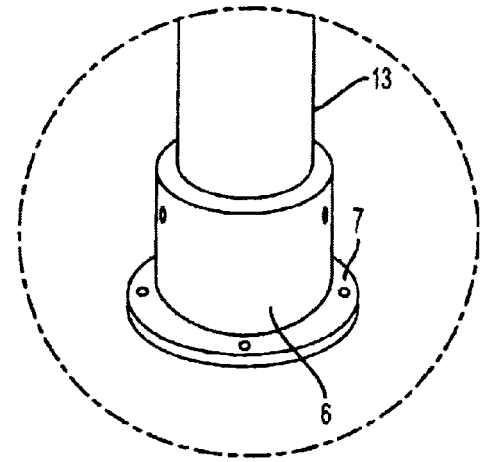
Figure 3:
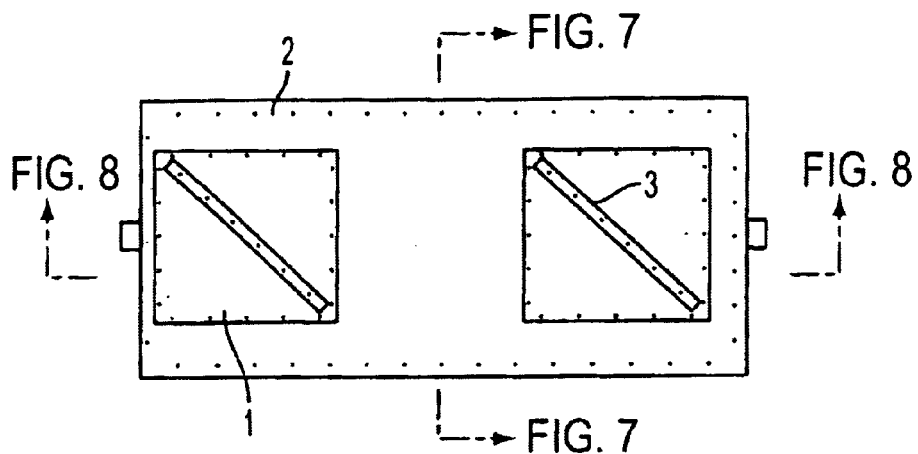
FIG. 3 is a top view of a septic tank according to the subject invention.
Figure 4:
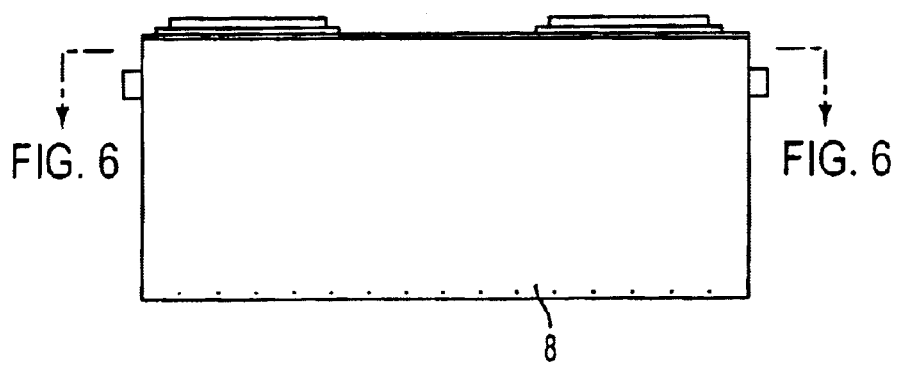
FIG. 4 is a side view of a septic tank according to the subject invention
Figure 5:
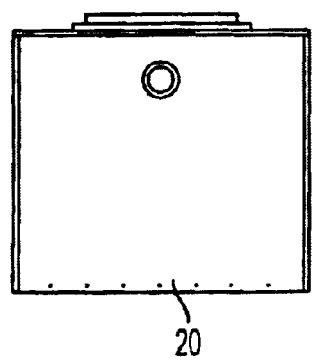
FIG. 5 is an end view of a septic tank according to the subject invention.
Figure 6B:
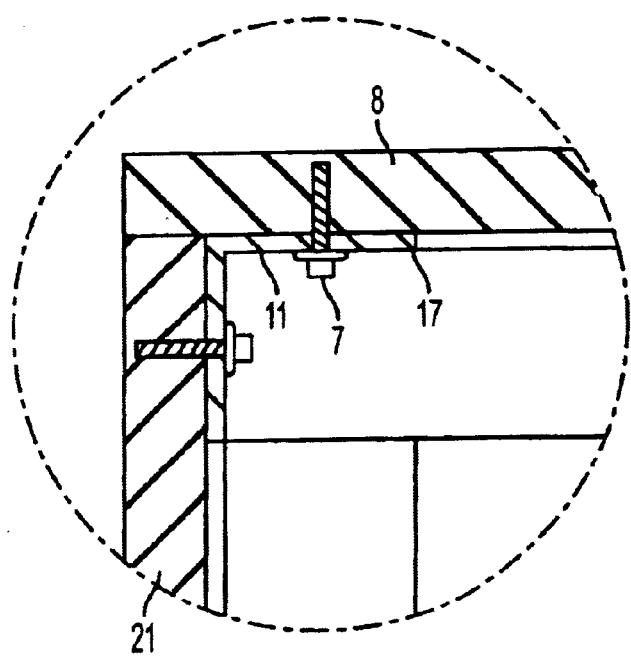
Figure 6C:
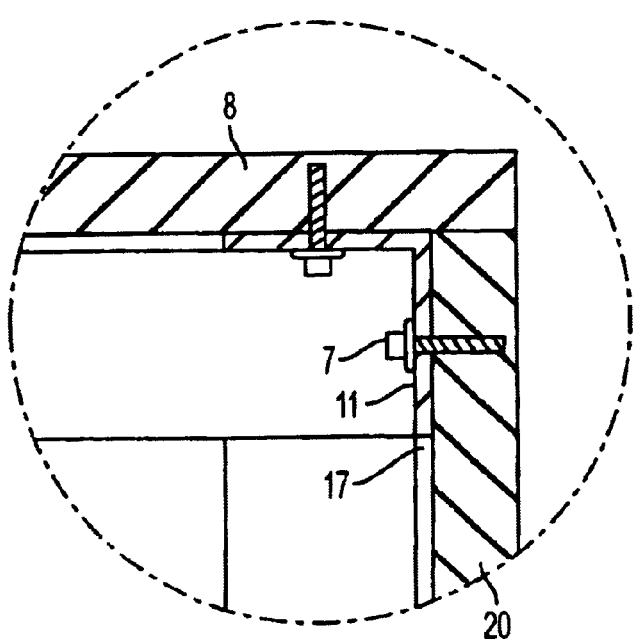
Figure 6D:
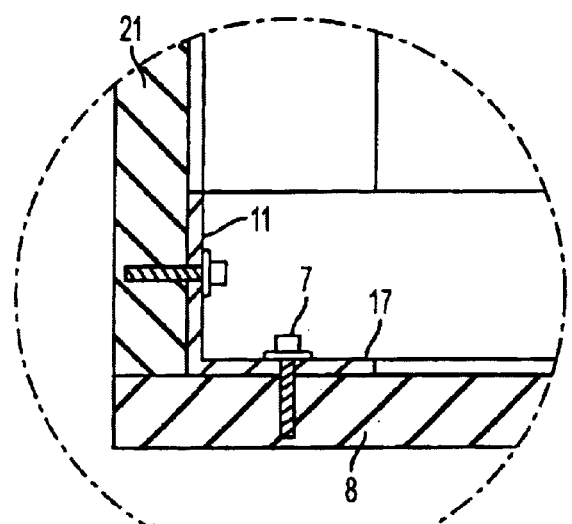
Figure 6E:
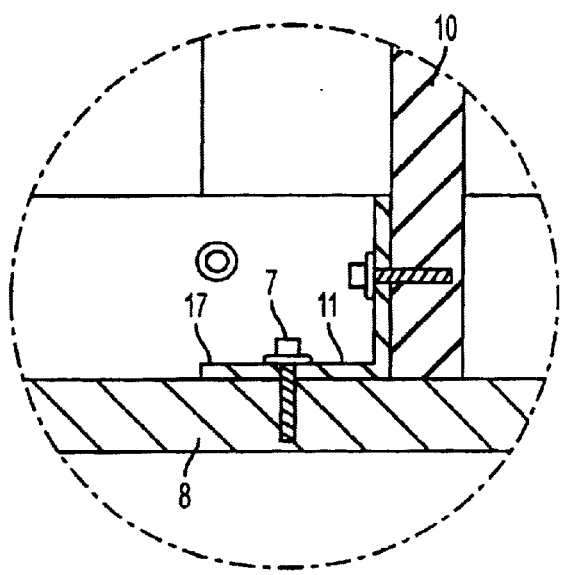
Figure 6F:
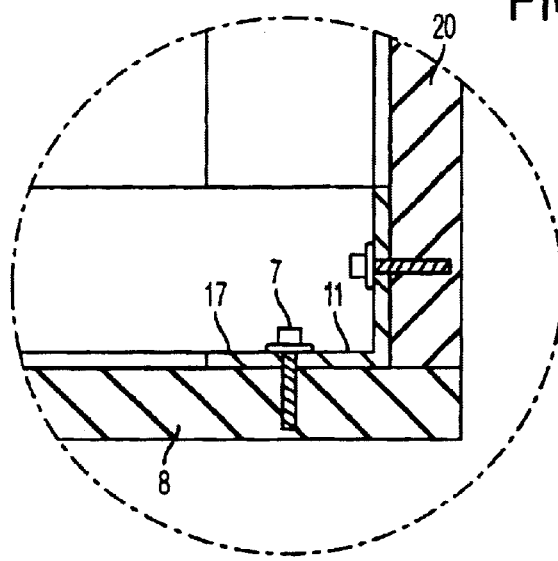
Figure 7A:
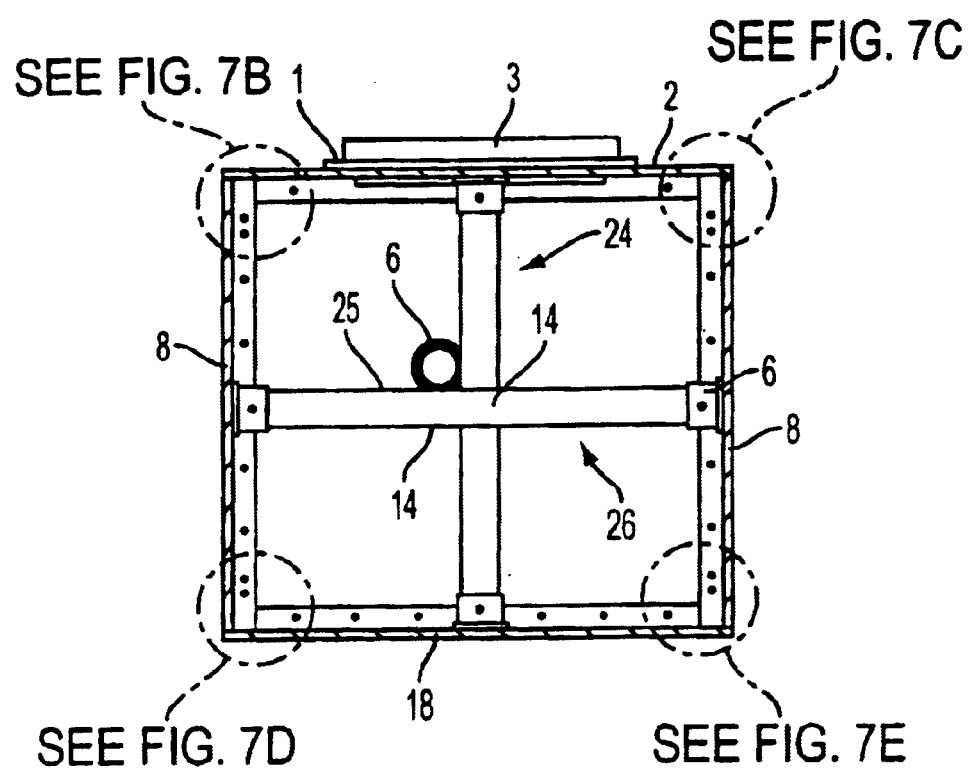
FIGS. 7A–E are open-end views of a septic tank according to the subject invention.
Figure 7B:
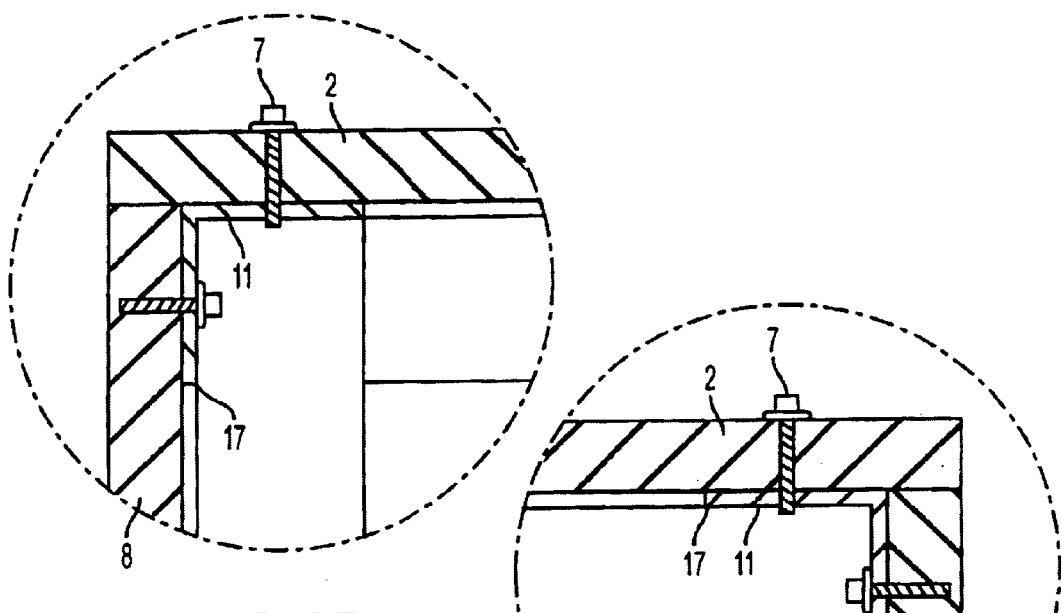
Figure 7C:
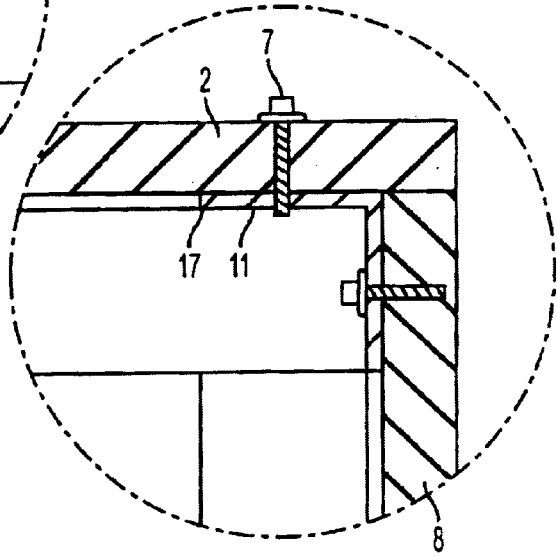
Figure 7D:
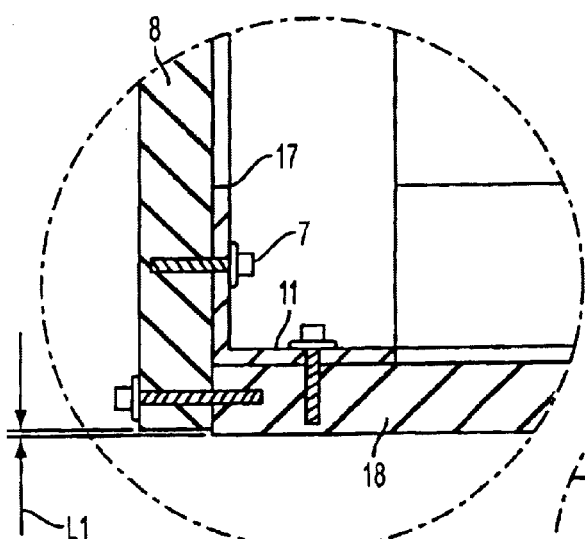
Figure 7E:
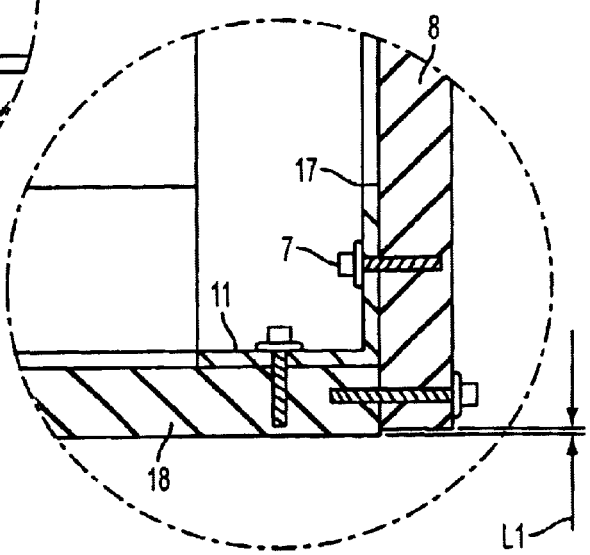
Figure 9:
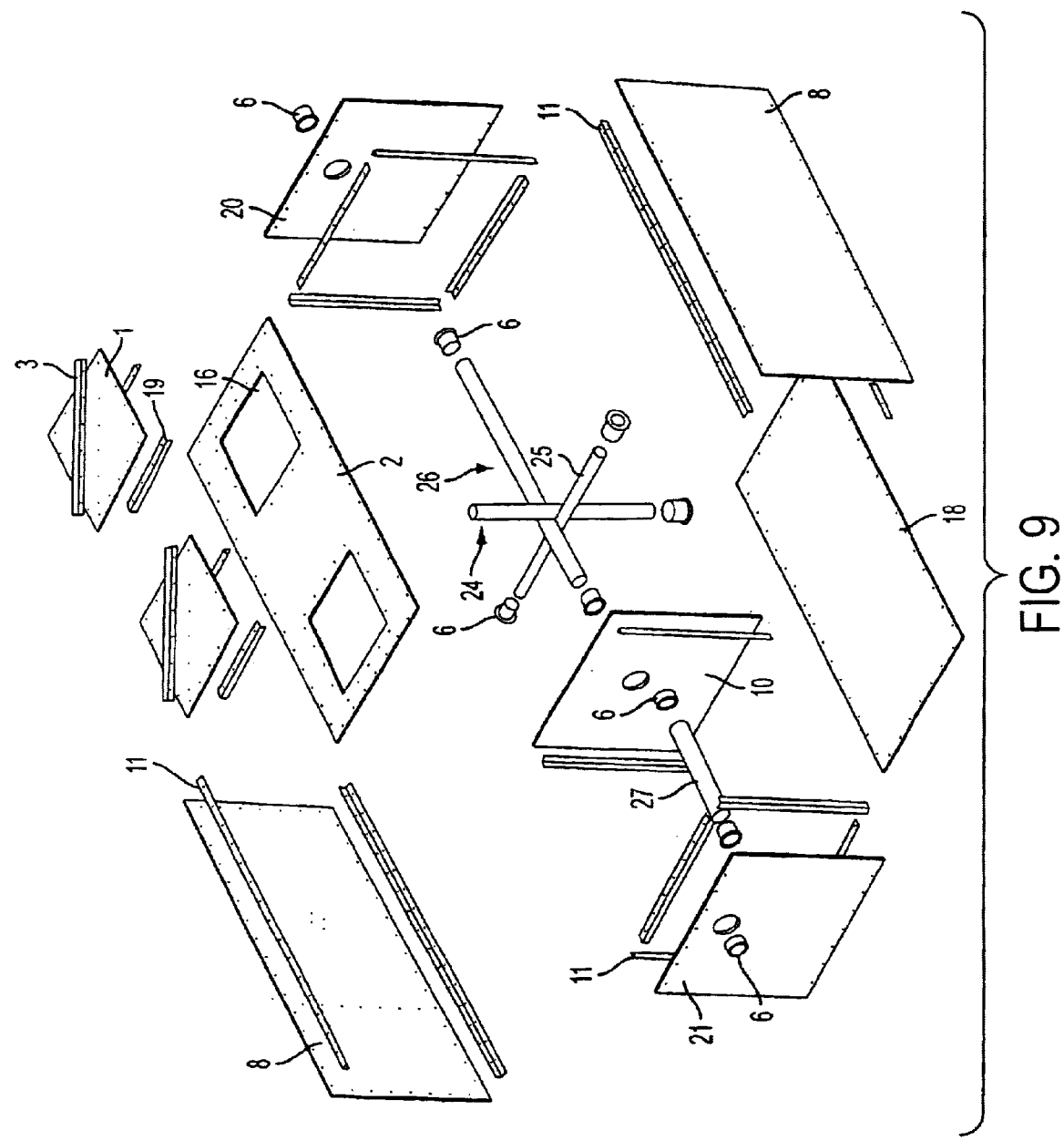
FIG. 9 is a perspective exploded view of a septic tank kit according to the subject invention.

As shown in FIGS. 1 and 9, one embodiment of a septic tank according to the subject invention comprises a tank lid 2, a tank bottom 18, a pair of opposing side walls 8, and a pair of opposing end walls 20, 21, an inlet end wall 20 and an outlet end wall 21. The tank lid 2 preferably comprises a pair of lid openings 16, which are covered by hatch covers 1. The hatch covers 1 each comprise a hatch handle 3 for ease of removal and are removably affixed to the tank lid 2 with angle alignment brackets 19 using, for example, stainless steel cap screws 7.

Figure 8B:
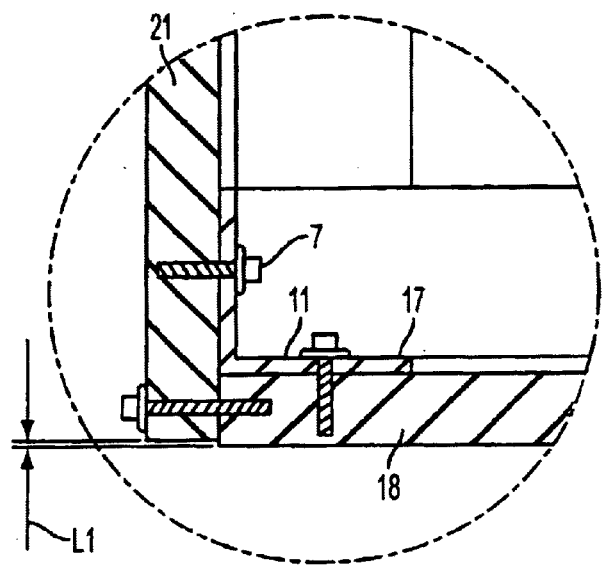
Figure 8C:
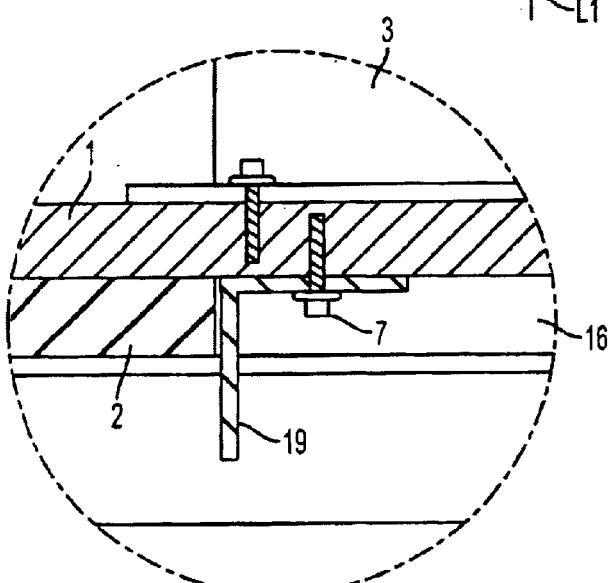
Figure 8D:
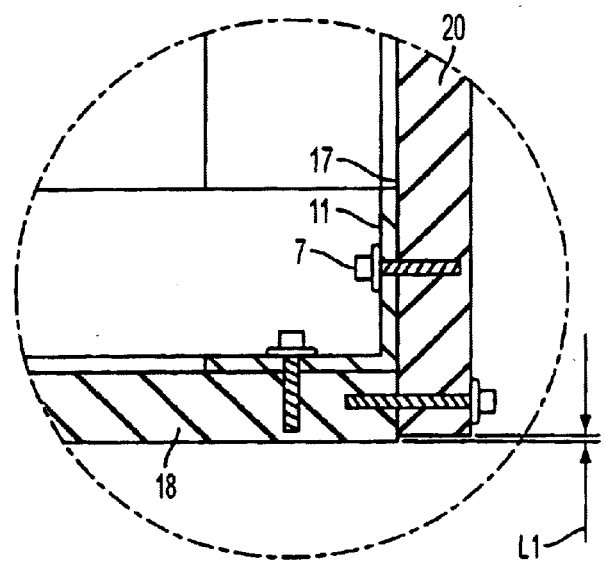

As shown in FIG. 8, the outlet 21 and inlet end walls 20 comprise tank flow outlet 4 and a tank flow inlet 5 respectively, where a flange 6 is affixed to each of the tank flow outlet 4 and tank flow inlet 5. The flange 6 is used to connect each of the flow inlet 5 and flow outlet 4 to the dwelling and drain field, respectively. In a preferred embodiment, flanges 6 can be plastic collars that are attached at tank flow outlet 4 and tank flow inlet 5 with a deformable O-ring seal placed between the collar and the surface of the end wall to provide a flexible seal. In a particularly preferred embodiment, flanges 6 at tank flow outlet 4 and tank flow inlet 5 are made of a flexible plastic or rubber, which is deformable while still maintaining an effective seal. Especially preferred in this regard are flanges such as the POLYLOK III, a septic tank seal available from Polylok, Inc., Yalesville, Conn.

In an embodiment, as shown in FIGS. 6–9, the septic tank is assembled using angle connection brackets 11, which can be plastic or made of some other material rigid enough to permit the assembled tank to retain its structural integrity (such as, for example, stainless steel), wherein the brackets 11 are affixed to the tank lid 2, tank bottom 18, side walls 8, and end walls 20, 21 using, for example, stainless steel cap screws 7. A silicone sealant 17 is interposed between the tank lid 2, tank bottom 18, side walls 8, end walls 20, 21 and the connection brackets 11, forming a substantially leak proof sealing gasket. Alternatively in this and other embodiments of the tank, other sealants such as PERMATEX or GE II silicone rubber sealant could be used as will be readily apparent to the skilled artisan. Further, the angle connection brackets can optionally be provided with sealant material prior to packaging of the kit. In an embodiment, the sealant material can be of a different color from the panels which serve as tank walls, top, or bottom; and different from the color of the connection bracket; so that one can readily see that the sealant has been applied. Alternatively, or in addition to use of screws in assembly of this and other embodiments of the tank, extrusion welding can be used to connect and/or seal the various panels and other plastic parts to each other.

In an embodiment, the septic tank kit further comprises a baffle 10, wherein the baffle 10 is positioned within the septic tank forming two compartments: an inlet compartment 22 encompassing approximately ⅔ of the total volume of the tank, and an outlet compartment 23. The baffle 10 presents a barrier which enables the larger sediment to settle in the inlet compartment 22, with the remaining effluent flowing into the outlet compartment 23 through the baffle port 12.

In an embodiment, the septic tank kit further comprises a plurality of structural support members 13, wherein the structural support members 13 are vertically and horizontally affixed to the tank bottom 18, side walls 8, and end walls 20, 21 optionally using a flange 6 at each attachment point. If flanges 6 are used to affix structural support members, then for this purpose it is generally preferred that they be of a relatively rigid construction, sufficiently rigid to ensure that the structural support members are affixed in place.

In an alternative embodiment, the structural supports 13 are connected to the tank bottom 18, side walls 8, and end walls 20, 21 using angled connectors 15.

In an embodiment, as shown in FIG. 9, the septic tank comprises two sets of structural support members 13. The inlet compartment 22 comprises at least three structural supports 13, a vertical support member 24 interposed between the tank lid 2 and the tank bottom 18, being connected to the tank bottom 18. The inlet compartment 22 further comprises two horizontal support members 25, 26, wherein a first horizontal support 25 is connected to and interposed between the side walls 8, and a second horizontal support 26 is connected to and interposed between the inlet end wall 20 and the baffle 10. The outlet compartment 23 comprises at least one horizontal support 27, wherein the horizontal support 27 is connected to and interposed between the outlet end wall 21 and the baffle 10.

In an embodiment, the structural support members 13 are 3" diameter schedule 80 PVC pipe. Three different exemplary embodiments for common tank applications are, for example, ½" thick bottom, sides, and ends, with a ¾" thick lid; ⅝" thick bottom, sides, and ends, with a ¾" thick lid; and ¾" thick bottom, sides, ends, and lid. Angle brackets in an embodiment can be 2"×2"×0.2" right angles, and the fasteners can be, for example, stainless steel screws such as, for example, ¼"×14×1¼" or ¼"×14×1½" hex head screws. As the ordinary artisan will readily appreciate, the dimensions of the panels, angles, support members, and fasteners can be optimized for the particular task at hand, considering the strength of the materials involved. Preferably, for most standard septic tank volumes, if the panels are made of copolymer polypropylene, they will be at least ¼" thick and no more than 4" thick, although depending on the volume of tank desired, it may be optimal to have panels with thicknesses outside of this range, as will be within the skill of the ordinary artisan to make such optimizations. As an example of the advantageous weight characteristics of septic tanks constructed in accord with the teachings herein, the following is a list of approximate weights of certain embodiments of tanks having various volumes, wherein the tanks are made with bottoms, sides, and ends of ½" thick copolymer and lids of ¾" thick copolymer:

| Tank Volume in Gallons | Approximate Weights (pounds) |
| --- | --- |
| 300 | ~350 lbs. |
| 750 | ~625 lbs. |
| 900 | ~700 lbs. |
| 1050 | ~750 lbs. |
| 1200 | ~810 lbs. |
| 1500 | ~950 lbs. |

The foregoing are merely intended to illustrate the advantageous weight benefits of the subject tanks (as compared to the much heaver prior art concrete tanks of the same volume). The weights can vary depending on a number of factors such as panel thickness, panel dimension, various associated hardware (such as some types of fasteners), panel composition, etc., as would be readily apparent to the skilled artisan, and still would be within the scope of the subject invention.

In an embodiment, the septic tank lid 2, a tank bottom 18, a pair of opposing side walls 8, pair of opposing end walls 20, 21, and hatch covers 1 are made of plastic that is copolymer, or homopolymer.

In an embodiment, the septic tank lid 2 comprises only one opening.

In alternative embodiments, any hatch covers can be made of the same, or different, materials than the sides, ends, bottom, and lid.

Although septic tanks of the subject invention can be assembled and then transported to the site of intended use for subsequent installation, in a method of use, the septic tank, which is available in kit form, is assembled at the work site. The septic tank is transported to the work site and assembled as follows:

In an embodiment, the end walls 20, 21 and side walls 8 are connected to the tank bottom 18 with the angle connection brackets 11, wherein the brackets 11 are affixed using, for example, stainless steel cap screws 7. Prior to assembly, a silicone sealant 17 is interposed between the tank bottom 18, side walls 8, and end walls 20, 21 and the connection brackets 11, forming a substantially leak proof seal to allow for proper function of the septic tank.

Figure 10:
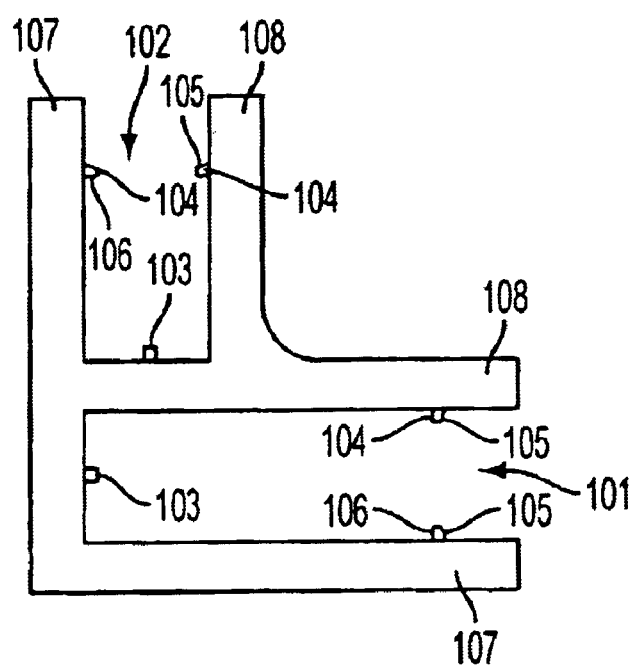
FIG. 10 is a cross-sectional view of an embodiment of the double-channel angle connection bracket according to the subject invention.
Figure 11:
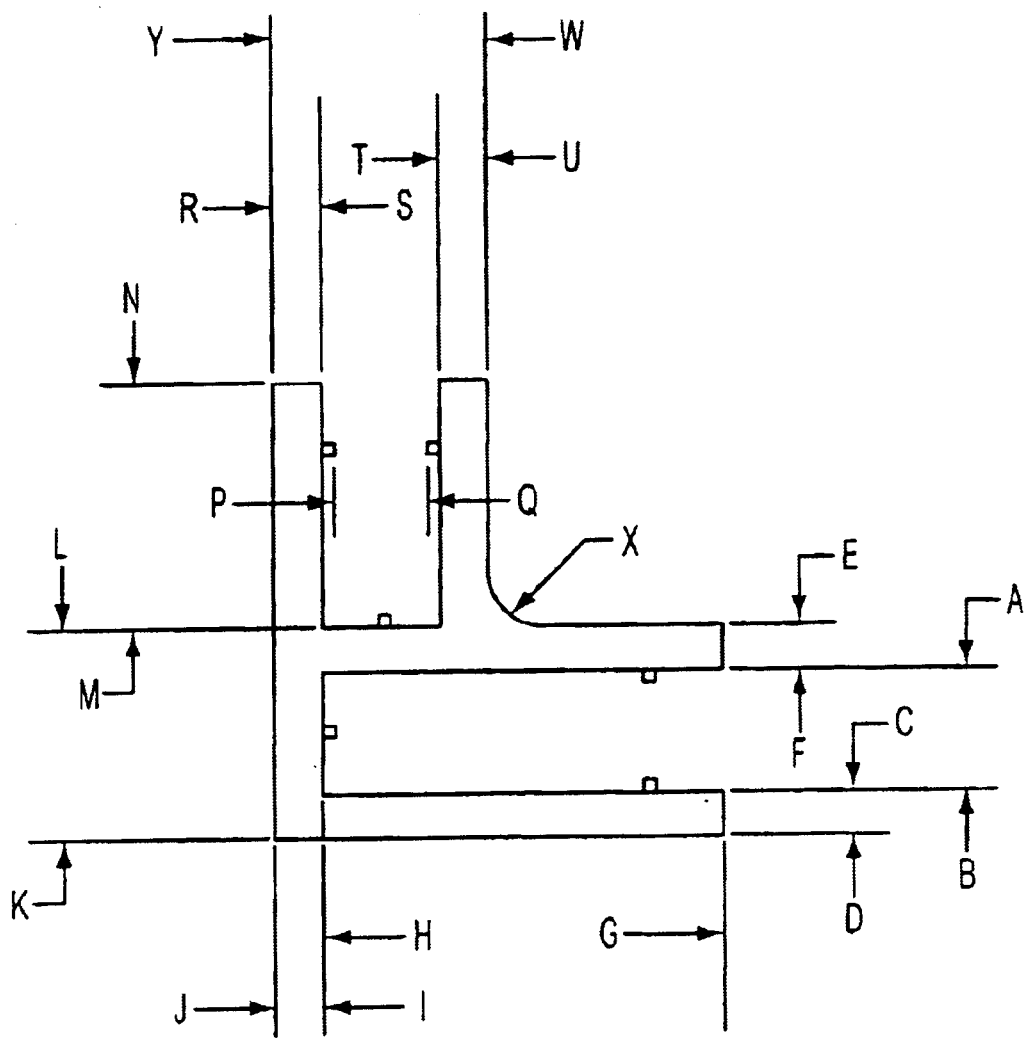
FIG. 11 is the cross-sectional view of the double-channel angle connection bracket depicted in FIG. 10, but with modified reference points for additional disclosure regarding specific dimensions of one embodiment described herein.

In a preferred embodiment, connection brackets 11 are in the form of double-channel angle brackets similar to that depicted in FIGS. 10 and 11. Referring to FIG. 10, the double-channel angle bracket of the subject invention comprises a deep panel receiving channel 101 and a shallow panel receiving channel 102 defined by external panel retaining walls 107 and internal panel retaining walls 108. In the embodiment depicted in FIG. 10, deep panel receiving channel 101 and shallow panel receiving channel 102 are oriented perpendicular to each other, for case of assembling substantially flat, sheet plastic panels into a septic tank having two sides, two ends, a lid, and a bottom, for example such as depicted in FIGS. 1–9. Flat panels are preferred for use according to the teachings herein, for ease of packaging the kit and sealing the tank. However, as will be readily apparent to the skilled artisan, absolute flatness is not a requirement to practice the subject invention. Preferably, the panels of the bottom, sides, ends, and lid are substantially flat. A "substantially" flat panel is one which deviates from its plane by no more than d, where $d^2=(0.05)A$, where A is the area of the panel in square inches. The plane of the panel can be defined by any 3 corners of the panel. In a preferred embodiment, $d^2=(0.045)A$; it is more preferred that $d^2=(0.04)A$; it is still more preferred that $d^2=(0.035)A$; even more preferred that $d^2=(0.03)A$; yet even more preferred that $d^2=(0.025)A$; particularly preferred that $d^2=(0.02)A$; more particularly preferred that $d^2=(0.015)A$; and most preferred that $d^2=(0.01)A$.

In alternative embodiments of the septic tank of the subject invention, the angle between the deep panel receiving channel and the shallow panel receiving channel can be either acute, or obtuse, as is required based on the intended ultimate configuration of the tank. For example, for the assembly of a tank having triangular side panels assembled in pyramidal form, all angles would be acute. See, for example, FIG. 16. Alternatively, tanks having a substantially trapezoidal cross-sectional appearance would comprise double-channel angle brackets which in some cases possessed an acute angle between the deep panel receiving channel and the shallow panel receiving channel, and in other places would require an obtuse angle between the panel receiving channels, as would be readily apparent to one of ordinary skill in the art viewing the embodiments depicted in FIGS. 12 and 13. Other embodiments, such as those having, for example, an octagonal cross-sectional appearance, would incorporate the use of double-channel angle brackets having predominantly obtuse angles between the receiving channels.

Returning to the embodiment depicted in FIG. 10, at the closed end of each receiving channel is preferably located a bottom stop 103 which is a slightly raised portion intended to prevent the edge of the inserted plastic panels from fully contacting the bottom of the panel receiving channels. Side stops 104 protrude from the inner surfaces of external walls 108. Each side stop is defined in part by sloped panel accommodation surface 105 and sealant retaining surface 106. Each sealant retaining surface 106 is preferably substantially perpendicular to the internal surface of the panel retaining walls 107 and 108 to more effectively retain compressed sealant within the interior of each panel receiving channel. In operation, side stops 104 serve to assist in centering the panels in their respective panel receiving channels, and also to retain sealant material compressed within the panel receiving channels. In a method of use, sealant is applied to the bottom of a panel receiving channel. As the panel is inserted into the panel receiving channel, its leading edges may encounter the sloped panel accommodations surfaces 105 of side stops 104. In a preferred embodiment, the sloped panel accommodation surface is angled so as to allow the leading edge of the panel to slide downward towards the bottom of the receiving channel. A panel is inserted fully into the channel, compressing the sealant until the panel contacts bottom stop 103. Sealant is forced up each side of the panel receiving channel and retained therein by sealant retaining surfaces 106 of each side stop 104.

As will be readily apparent to the ordinary skilled artisan, the panel thickness can vary depending on the size of the tank desired and the strength of the materials from which the panel is made, and the dimensions of the double-channel angle bracket according to the subject invention can be appropriately modified accordingly. However, for illustrative purposes, an example of a double-channel angle bracket depicted in FIG. 11 has dimensions which are suitable for accommodating panels of ½ inch thickness, and are as follows:

AB and ST are ⅝ inch
CD, EF, IJ, RS, and TU are ¼ inch
GH is 2⅛ inches
KL and VW are 1⅛ inch
MN is 1¼ inch
PQ is ½ inch
QT and PS 1/16 inch and
X is effectively a 90° angle causing deep panel receiving channel 101 and shallow panel receiving channel 102 to be perpendicular, with the internal corner at X effectively rounded at ¼ inch radius.

In a embodiment, the double-channel angle connection brackets can be provided with predrilled holes through which fasteners, such as stainless steel screws or any other fastener known to those of ordinary skill in the art which is effective for assembling the tank, can be inserted. In an alternative embodiment, the double-channel angle bracket can be drilled at the site of assembly. Optionally, as provided in the kit according to the subject invention, the double-channel connection brackets can be premounted on one or more of the edges of one or more of the panels in the septic tank kit.

In an embodiment, a baffle 10 is positioned within the partially assembled septic tank, forming two compartments, an inlet compartment 22 and an outlet compartment 23, where the inlet compartment 22 encompasses approximately ⅔ of the total volume of the tank. The baffle 10 presents a barrier which enables the larger sediment to settle in the inlet compartment 22, with the remaining effluent flowing into the outlet compartment 23 through the baffle port 12.

In an embodiment, structural support members 13 are positioned within and connected to the tank bottom 18, side walls 8, and end walls 20, 21. The inlet compartment 22 comprises at least three structural supports 13, a vertical support 24 interposed between the tank lid 2 and the tank bottom 18, being connected to the tank bottom 18. The inlet compartment 22 further comprises two horizontal supports 25, 26, where a first horizontal support 25 is connected to and interposed between the side walls 8, and a second horizontal support 26 is connected to and interposed between the inlet end wall 20 and the baffle 10. The outlet compartment comprises at least one horizontal support 27, wherein the horizontal support 27 is connected to and interposed between the outlet end wall 21 and the baffle 10.

The tank lid 2 is positioned on top of the partially assembled septic tank and connected to the brackets 11 using fasteners, such as, for example, stainless steel screws.

In an embodiment, the tank lid 2 comprises pre-drilled connection holes to facilitate attachment to the brackets 11.

In an embodiment, either or both of the tank lid 2 and tank bottom 18 can be provided in the kit with the connection brackets preattached to at least one edge thereof. In a preferred embodiment, double-channel angle connection brackets according to the subject invention are provided in the kit preattached to the edges of either or both of the tank lid 2 and tank bottom 18, preferably with the connection bracket affixed to the lid panel such that the edge of the lid panel is inserted into deep panel receiving channel 101 of each double-channel connection bracket affixed to its perimeter. Similarly, in an embodiment the bottom panel has double-channel connection brackets affixed thereto such that the panel edges are inserted into the deep panel receiving channel 101 of each double-channel connection bracket around its periphery. In this embodiment, as the kit is unpacked and the tank is assembled, the tank bottom 18 having double-channel angle connection brackets preaffixed around its periphery will be configured such that side panels can be inserted into shallow panel receiving channels 102 and then ultimately the tank lid, also having double-channel angle connection brackets affixed around its periphery can be lowered into place, with the top edges of the panels making up the side and end walls being inserted into the downward oriented shallow panel receiving channels 102 projecting perpendicularly downward from the periphery of the tank lid. Connection brackets are preferably used to connect the side walls to the end walls along the vertical edges where they meet. In a preferred embodiment, fasteners are inserted through the connection brackets and the panels contained therein to fasten the walls, top, and bottom of the tank in place. Extrusion welding can optionally replace or augment the connection of panels one to another.

The hatch covers 1 are positioned and connected to the tank lid 2 using alignment brackets 19 and appropriate fasteners, such as, for example, stainless steel screws.

In an embodiment, the tank lid 2 and the hatch covers 1 comprise pre-drilled connection holes to facilitate attachment to the alignment brackets 19.

Figure 12:
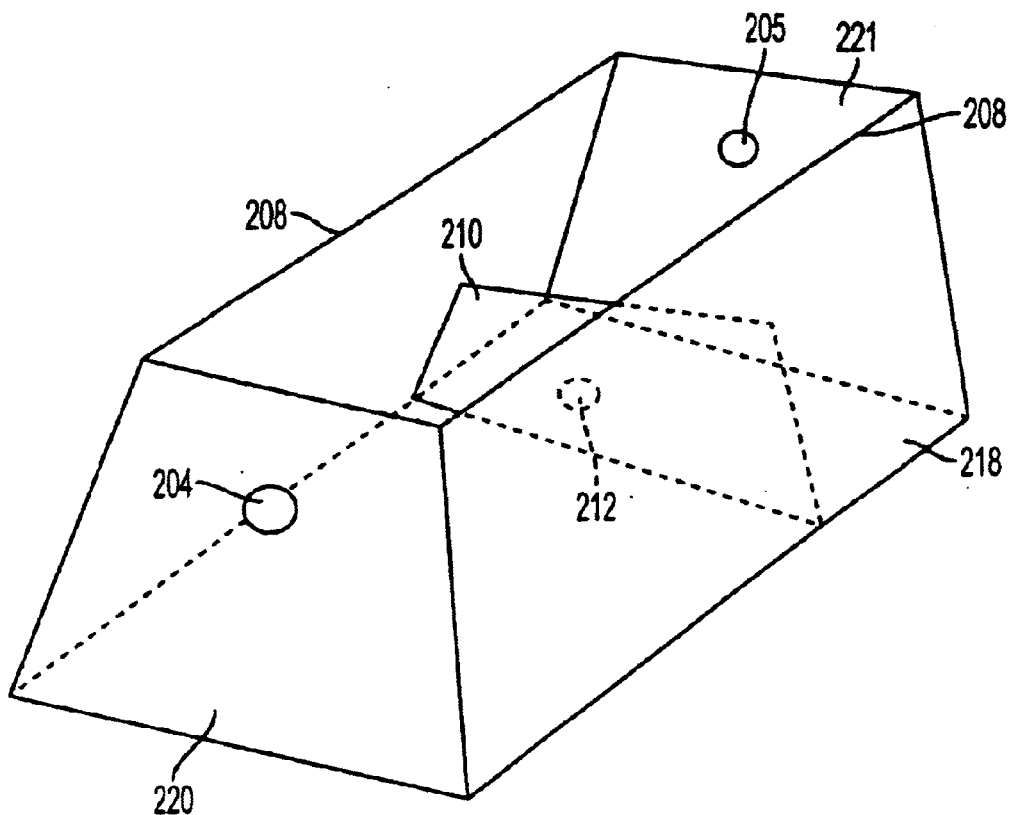
FIG. 12 is a not-to-scale open top perspective view of an embodiment of a septic tank according to the subject invention which has a substantially trapezoidal cross-sectional appearance.

In alternative embodiments, the septic tank kit can, upon assembly, yield tanks of various dimensions and configurations, as will be readily apparent to one of ordinary skill in the art in view of the teachings herein. For example, an alternative embodiment is depicted in FIG. 12, wherein the assembled tank has a substantially trapezoidal cross-section appearance. FIG. 12 depicts the tank without its lid, and without optional internal supports, being merely intended to illustrate the alternative configurations possible using substantially flat plastic panels in the kit of the subject invention. In FIG. 12 are depicted opposing side walls 208, inlet end wall 220, outlet end wall 221, tank flow inlet 204, tank flow outlet 205, tank bottom 218, baffle 210, and baffle port 212.

Figure 13:
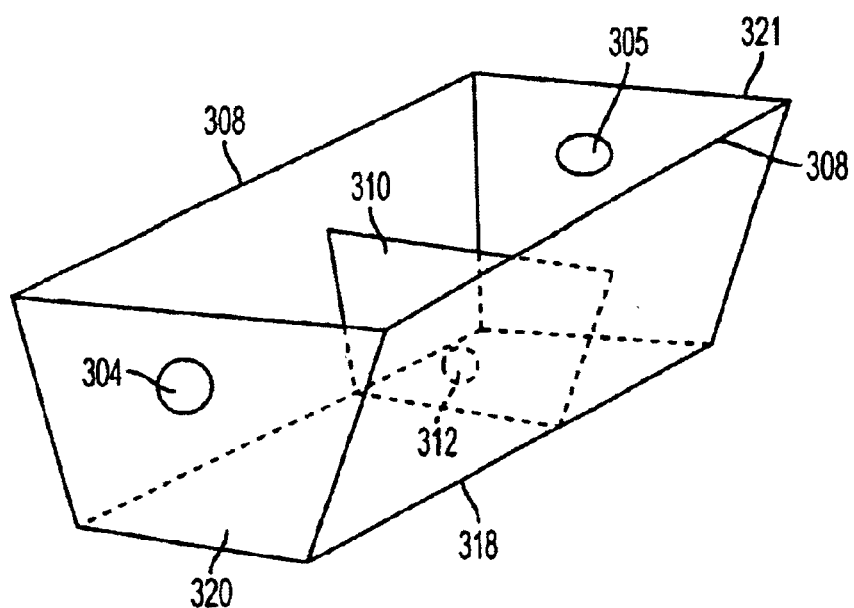
FIG. 13 is a not-to-scale open top perspective view of an embodiment of a septic tank according to the subject invention which has a substantially trapezoidal cross-sectional appearance.

Referring to FIG. 13, an alternative embodiment, also of substantially trapezoidal cross-sectional appearance, is depicted open top. This embodiment represents an inversion of the embodiment depicted in FIG. 12, but having improved anti-buoyancy characteristics due to the increased surface area of the tank lid (not depicted) as compared to the tank bottom 318. In this embodiment are depicted inlet end wall 320, outlet end wall 321, tank flow inlet 304, tank flow outlet 305, opposing side walls 308, baffle 310, and baffle port 312.

Figure 14:
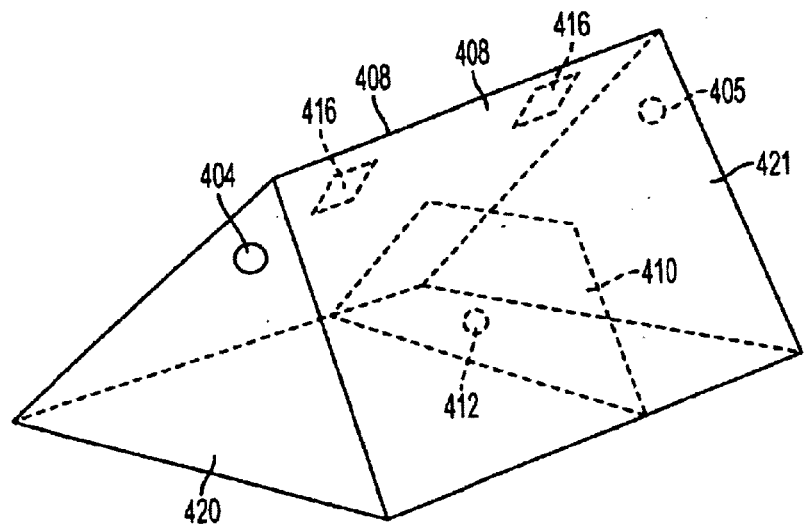
FIG. 14 is a not-to-scale perspective view of an embodiment of a septic tank according to the subject invention which has a substantially triangular cross-sectional appearance.

Yet another alternative embodiment is depicted in FIG. 14, wherein the assembled tank has a substantially triangular cross-sectional appearance. Represented in FIG. 14 are tank inlet end wall 420, tank flow inlet 404, side walls 408, lid openings 416, baffle 410, baffle port 412, tank outlet end wall 421, and tank flow outlet 405.

Figure 15:
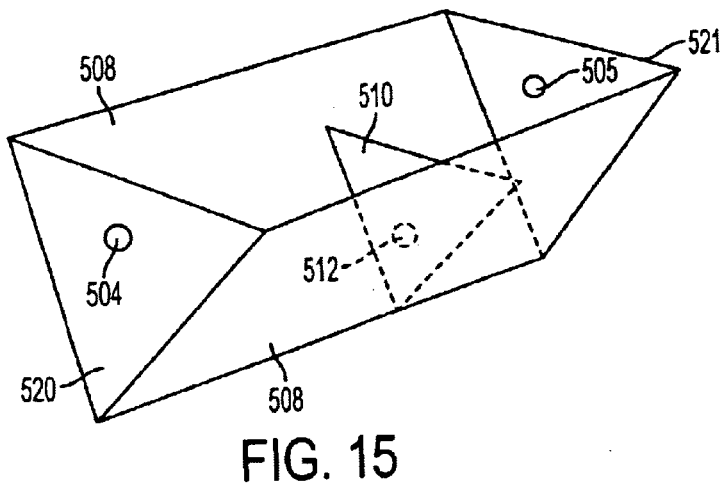
FIG. 15 is a not-to-scale open top perspective view of an embodiment of a septic tank according to the subject invention which has a substantially triangular cross-sectional appearance.

Turning now to FIG. 15, yet another tank according to the subject invention is depicted which has a substantially triangular cross-sectional appearance, and is shown open top. As compared to the embodiment depicted in FIG. 14, this embodiment has improved anti-buoyancy characteristics due to the substantial surface area of the tank top (lid not depicted), and the almost negligible surface area of the bottom, which is formed at the vertex of the meeting of side walls 508. Also represented in this figure are tank inlet end wall 520, tank flow inlet 504, tank outlet end wall 521, tank flow outlet 505, baffle 510, and baffle port 512.

Figure 16:
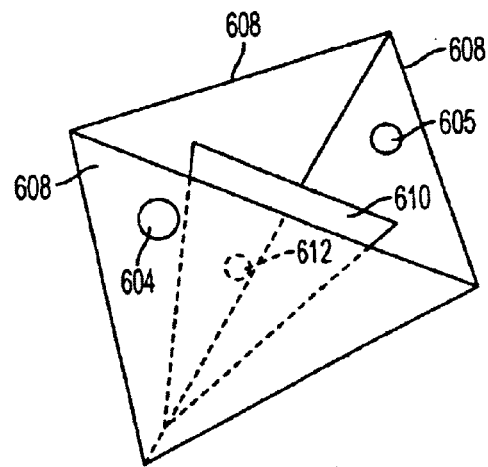
FIG. 16 depicts yet another alternative embodiment of a septic tank according to the subject invention which is substantially an inverted triangular-based pyramid in appearance, depicted with an open top.

Still another embodiment of a tank assembly provided in kit form according to the subject invention is depicted in FIG. 16. This embodiment comprises a minimum of four substantially flat panels (if one excludes the optional baffle 610, which is depicted in this configuration). Represented in FIG. 16 are three triangular shaped sidewalls 608, tank flow inlet 604, tank flow outlet 605, optional baffle 610, and baffle port 612. Not depicted is the triangular shaped panel which would serve as a lid for this embodiment of the tank. Excluding the optional baffle, this embodiment of the tank comprises four substantially flat panels.

As is readily apparent to one of ordinary skill in the art in view of the foregoing, a wide variety of septic tank configurations can be provided in kit form according to the teachings herein.

It should be understood that the examples and embodiments described herein are for illustrative purposes only and that various modifications or changes in light thereof will be suggested to persons skilled in the art and are to be included within the spirit and purview of this application.

I claim:

1. A septic tank kit comprising:

a substantially flat plastic bottom panel;

a substantially flat plastic lid panel, said lid panel having at least one opening therein;

two substantially flat plastic side panels;

two substantially flat plastic end panels, one of said end panels having a tank flow inlet and the other of said end panels having a tank flow outlet;

a baffle panel having a baffle port therein;

a plurality of double-channel angle connection brackets;

at least one hatch cover corresponding to each opening in said lid panel;

means for sealing said bottom panel, said side panels, said end panels, and said lid panel where they are connected one to another; and instructions for assembling all of the foregoing into a septic tank.

2. A septic tank kit according to claim 1, further comprising a plurality of fasteners.

3. A septic tank kit according to claim 2, wherein said fasteners comprise stainless steel screws.

* * * * *